UNITED STATES PATENT OFFICE.

PATRICK KENNEDY, OF NEW YORK, N. Y.

IMPROVED CEMENT FOR FIXING DOOR-KNOBS.

Specification forming part of Letters Patent No. 65,680, dated June 11, 1867; Reissue No. 2,916, dated April 14, 1868.

*To all whom it may concern:*

Be it known that I, PATRICK KENNEDY, of the city, county, and State of New York, have invented a new and Improved Cement; and I do hereby declare that the following is a full, clear, and exact description thereof, which will enable others skilled in the art to make and use the same.

This invention relates to a new composition for making a cement, which is to be particularly adapted for securing door or furniture knob tops to the metal shanks, but which may also be used for other purposes.

Heretofore door or furniture knob tops were always fastened to their shanks by means of lead, which is very expensive and not very convenient to handle. By the use of my improved cement the attachment of the knobs to the shanks will be materially facilitated and considerably less expensive.

The cement is composed of the following ingredients, in about the proportions set forth, and compounded in the manner hereinafter described: Two parts of alum, (sulphate of alumina,) one part of copperas, (sulphurate of iron,) and one part of white or other sand are mixed in about four (4) or less parts of water, and are boiled until the alum is dissolved. The mixture is boiled down so as to evaporate the water until the compound has about the consistency of gruel. It is then ready for use, and will, after having been applied, harden, so as to be harder and less porous than marble. The alumina and astringent properties of the alum bind the particles of the sand and unite the same, so that they will adhere, while the copperas prevents the cement from becoming brittle, and adds to its substance.

The cement will not be as good if the copperas is omitted, but will still be very useful for many purposes; and my invention consists in the combination of alum with sand alone. Instead of the sand, any other silicious substance may be employed. If the copperas is omitted, the quantity of alum may be increased so as to form the equivalent of the copperas.

I do not claim this cement as a new composition; but

I do claim as new and desire to secure by Letters Patent—

The application of a cement which is composed of sand and alum, with or without the addition of copperas, for fastening door or furniture knob tops to their metal or other shanks, as set forth.

The above specification of my invention signed by me this 6th day of January, 1868.

PATRICK KENNEDY.

Witnesses:
WM. F. MCNAMARA,
ALEX. F. ROBERTS.